United States Patent
Okita et al.

(10) Patent No.: US 9,483,945 B2
(45) Date of Patent: Nov. 1, 2016

(54) VEHICLE CONTROL DEVICE AND VEHICLE CONTROL METHOD

(75) Inventors: Toshinori Okita, Gotenba (JP); Hirofumi Aoki, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 13/503,735

(22) PCT Filed: Apr. 11, 2011

(86) PCT No.: PCT/JP2011/059023
§ 371 (c)(1),
(2), (4) Date: Apr. 24, 2012

(87) PCT Pub. No.: WO2012/140721
PCT Pub. Date: Oct. 18, 2012

(65) Prior Publication Data
US 2012/0323403 A1    Dec. 20, 2012

(51) Int. Cl.
*G08G 1/16*    (2006.01)
*B60W 50/14*    (2012.01)
(Continued)

(52) U.S. Cl.
CPC .............. *G08G 1/161* (2013.01); *B60W 30/16* (2013.01); *B60W 30/17* (2013.01); *B60W 50/14* (2013.01); *G08G 1/166* (2013.01); *B60W 2050/0071* (2013.01); *B60W 2050/0095* (2013.01);
(Continued)

(58) Field of Classification Search
USPC ................................ 701/1, 2, 70, 94, 96, 117
See application file for complete search history.

(56) References Cited

U.S. PATENT DOCUMENTS 7,388,477 B1    6/2008   Manning

2004/0249549 A1    12/2004   Kondoh et al.
(Continued)

FOREIGN PATENT DOCUMENTS

JP    8 36697    2/1996
JP    8 80793    3/1996
(Continued)

OTHER PUBLICATIONS

International Search Report Issued May 10, 2011 in PCT/JP11/59023 Filed Apr. 11, 2011.
(Continued)

*Primary Examiner* — Redhwan k Mawari
*Assistant Examiner* — Rodney P King
(74) *Attorney, Agent, or Firm* — Oblon, McClelland, Maier & Neustadt, L.L.P.

(57) ABSTRACT

A vehicle control device for starting a drive assist in accordance with relative positional relationship between a self vehicle and an object around the self vehicle, comprises a control value calculating part which calculates a control value based on an inter-vehicular distance between the self vehicle and the object, a velocity of the self vehicle, a relative velocity of the object to the self vehicle, and an acceleration-related value obtained based on at least one of an acceleration of the self vehicle and an acceleration of the object; an acceleration-related value adjusting part which adjusts the acceleration-related value by changing a degree of contribution of at least one of the acceleration of the self vehicle and the acceleration of the object in the acceleration-related value in accordance with the acceleration of the self vehicle; and a drive assist start judging part which starts the drive assist if the control value is greater than a threshold value.

7 Claims, 20 Drawing Sheets

(51) Int. Cl.
*B60W 30/16* (2012.01)
*B60W 30/17* (2012.01)
*B60W 50/00* (2006.01)

(52) U.S. Cl.
CPC .. *B60W2520/105* (2013.01); *B60W 2550/302* (2013.01); *B60W 2550/308* (2013.01); *B60W 2720/106* (2013.01)

(56) References Cited

U.S. PATENT DOCUMENTS

| | | | |
|---|---|---|---|
| 2007/0021876 | A1 | 1/2007 | Isaji et al. |
| 2009/0037052 | A1 | 2/2009 | Ogasawara et al. |
| 2009/0105922 | A1 | 4/2009 | Morita |
| 2010/0228419 | A1* | 9/2010 | Lee et al. .................. 701/25 |
| 2010/0274435 | A1 | 10/2010 | Kondoh et al. |
| 2011/0190972 | A1 | 8/2011 | Timmons et al. |
| 2012/0072089 | A1 | 3/2012 | Nemoto et al. |

FOREIGN PATENT DOCUMENTS

| | | |
|---|---|---|
| JP | 2000-215399 A | 8/2000 |
| JP | 2002 362268 | 12/2002 |
| JP | 2003 58994 | 2/2003 |
| JP | 2004 362225 | 12/2004 |
| JP | 2005 53384 | 3/2005 |
| JP | 3733768 | 1/2006 |
| JP | 2007 276508 | 10/2007 |
| JP | 2008 260527 | 10/2008 |
| JP | 2010 228644 | 10/2010 |
| JP | 2010 244346 | 10/2010 |
| JP | 2010 274838 | 12/2010 |
| JP | 2011 6038 | 1/2011 |

OTHER PUBLICATIONS

U.S. Office Action mailed May 7, 2014 in co-pending U.S. Appl. No. 13/970,233.
U.S. Office Action mailed Oct. 2, 2014 in co-pending U.S. Appl. No. 13/970,233.
Office Action issued on Mar. 3, 2015 in related U.S. Appl. No. 13/970,233.
Office Action issued on Jul. 16, 2015 in U.S. Appl. No. 13/970,233.
Office Action issued on Jan. 15, 2016 in U.S. Appl. No. 13/970,233.
Office Action issued on Jun. 16, 2016 in U.S. Appl. No. 13/970,233.

* cited by examiner

FIG.3A
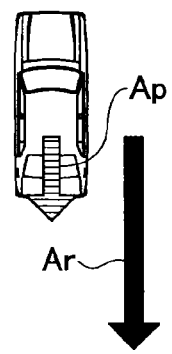
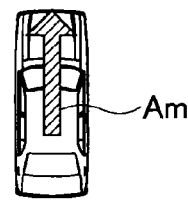
FIG.3B
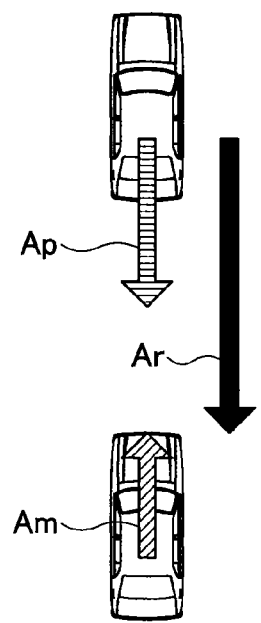

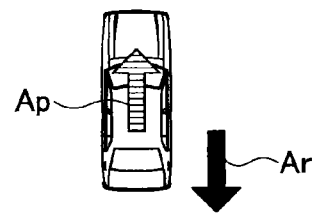
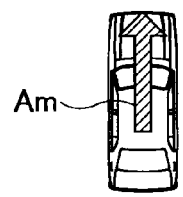
FIG.3E
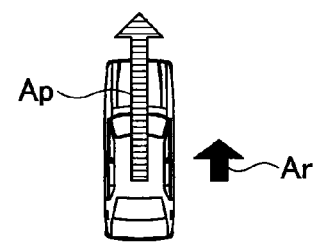
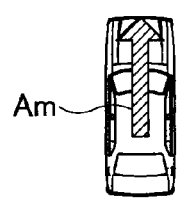
FIG.3F

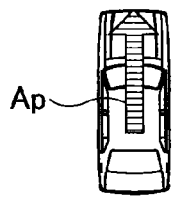
FIG.3G
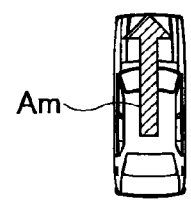
FIG.3H
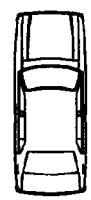

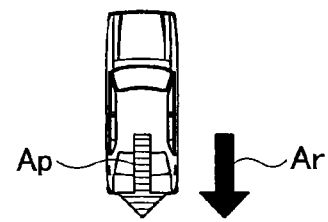
FIG.3I
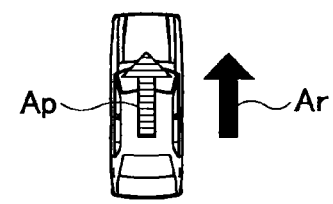
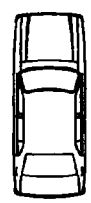
FIG.3J

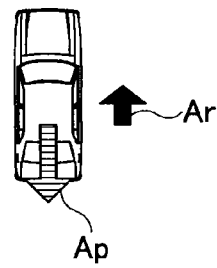
FIG.4A
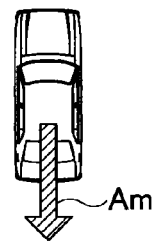
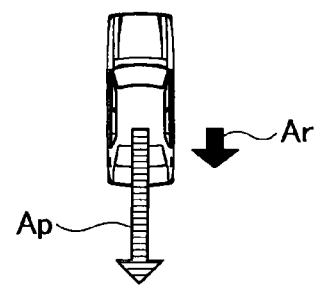
FIG.4B
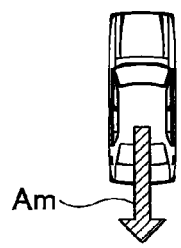

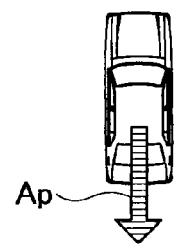
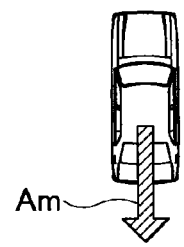
FIG.4C
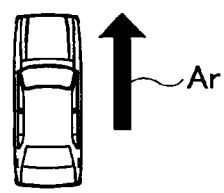
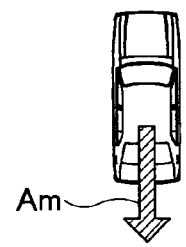
FIG.4D

FIG.4E
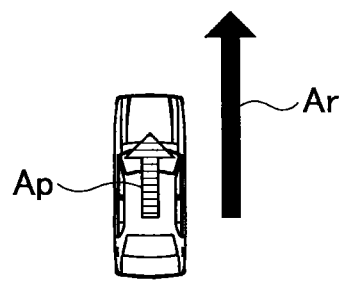
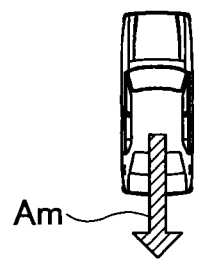

FIG.4F
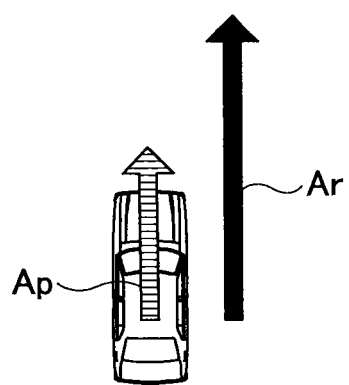
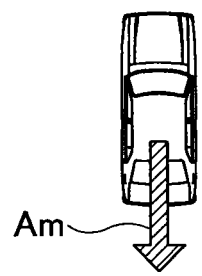

FIG.4G
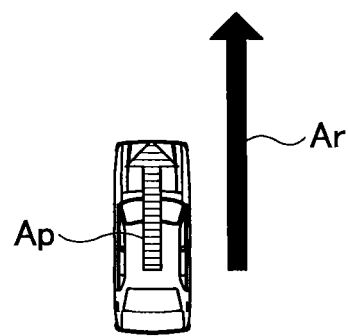
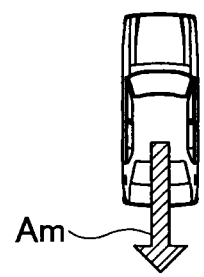

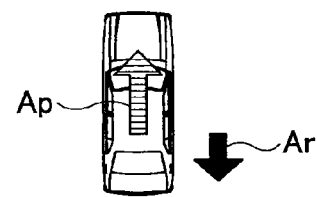
FIG.7A
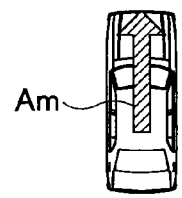
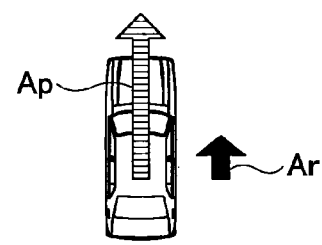
FIG.7B
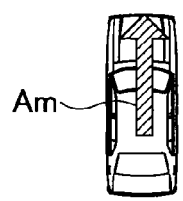

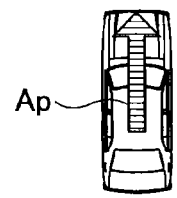
FIG.7C
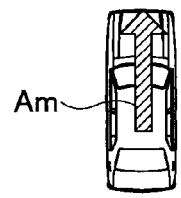
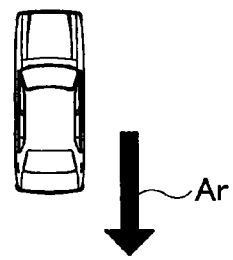
FIG.7D
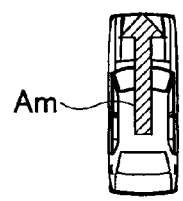

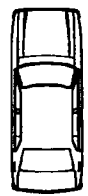
FIG.7E
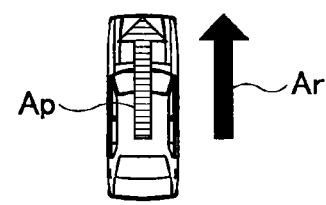
FIG.7F
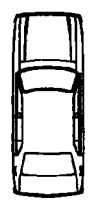

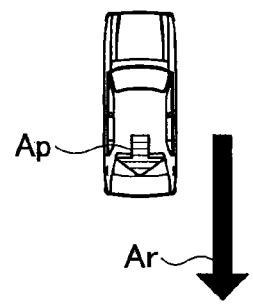
FIG.8C
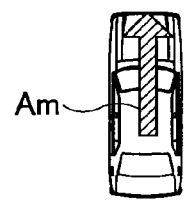
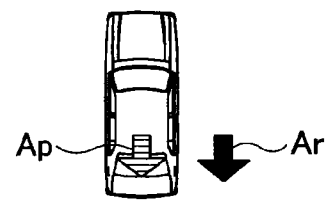
FIG.8D

VEHICLE CONTROL DEVICE AND VEHICLE CONTROL METHOD

TECHNICAL FIELD

The present invention relates to a vehicle control device and a vehicle control method which control a self vehicle in accordance with a relative positional relationship between the self vehicle and an object around the self vehicle.

BACKGROUND ART

Conventionally, a collision avoidance device is known (see Patent Document 1 for example). The collision avoidance device calculates a predictive value of a possible collision based on a velocity of a self vehicle and an inter-vehicular distance between the self vehicle and a leading vehicle. Then, the collision avoidance device outputs an alarm if the calculated predictive value is greater than or equal to a predetermined threshold value. This collision avoidance device judges whether a driver of the self vehicle intends to accelerate the self vehicle based on an acceleration of the self vehicle. If the device judges that the driver intends to accelerate the self vehicle, the device adjusts the predictive value downward or adjusts the threshold value upward in order to make the alarm less likely to output. Also, this collision avoidance device judges whether a behavior of the leading vehicle is abnormal based on an acceleration of the leading vehicle. If the device judges that a behavior of the leading vehicle is abnormal, the device adjusts the predictive value upward or adjusts the threshold value downward in accordance with the acceleration of the leading vehicle in order to make the alarm more likely to output.

Vehicle control devices are also known (see Patent Documents 2 and 3 for example). These vehicle control devices calculate a control value based on an inter-vehicle distance between a self vehicle and a leading vehicle, a relative velocity, a relative acceleration, and a velocity of the self vehicle. Then, these devices output an alarm if the calculated control value is greater than or equal to a predetermined threshold value. These devices calculate the control value based on an acceleration of the leading vehicle in place of the relative acceleration if the leading vehicle decelerates relative to the self vehicle. In this way, the devices reflect the acceleration of the leading vehicle on a determination of an alarm output timing independently. Meanwhile, the acceleration of the leading vehicle changes independently of a manipulation of a driver of the self vehicle.

An in-car device is also known (see Patent Document 4 for example). The in-car device outputs an alarm if an inter-vehicular distance between a self vehicle and a leading vehicle is less than a distance calculated based on a relative velocity, a velocity of the self vehicle, an acceleration of the self vehicle, and a degree of certainty that a driver of the self vehicle intends to follow the leading vehicle while shortening the inter-vehicular distance. The degree of certainty is calculated based on standard deviations of each of the inter-vehicular distance, the relative velocity, and the relative acceleration within a predetermined period of time. This in-car device calculates the distance to be shorter if the driver intends to follow the leading vehicle while shortening the inter-vehicular distance, i.e., if the degree of certainty is high, in order to make the alarm less likely to output.

[Patent Document 1] Japanese Patent Publication No. 2005-53384

[Patent Document 2] Japanese Patent Publication No. 2010-274838

[Patent Document 3] Japanese Patent Publication No. 2011-6038

[Patent Document 4] Japanese Patent No. 3733768

DISCLOSURE OF THE INVENTION

Problems to be Solved by the Invention

However, the collision avoidance device in Patent Document 1 does not reflect the acceleration of the self vehicle or the leading vehicle independently on the calculation of the predictive value even if the device judges that the driver of the self vehicle intends to accelerate the self vehicle. Also, the collision avoidance device in Patent Document 1 does not reflect the acceleration of the self vehicle independently on the calculation of the predictive value even if the device judges that the behavior of the leading vehicle is abnormal based on the acceleration of the leading vehicle.

The vehicle control devices in Patent Documents 2 and 3 calculate the control value in consideration of the acceleration of the leading vehicle if the leading vehicle decelerates relative to the self vehicle. However, the devices do not reflect the acceleration of the self vehicle independently on the calculation of the control value.

The in-car device in Patent Document 4 judges that the driver of the self vehicle intends to follow the leading vehicle while shortening the inter-vehicular distance if variation in relative positional relationship between the self vehicle and the leading vehicle (e.g., a relative acceleration) is small. Then, the device makes the alarm less likely to output. However, the device does not reflect the acceleration of the self vehicle or the leading vehicle independently on a determination of an alarm output timing.

In this way, the devices described in Patent Documents 1 to 4 are not able to sufficiently reflect the acceleration of the self vehicle or the leading vehicle individually on the determination of the alarm output timing. Thus, the devices are not able to determine an alarm output timing appropriately.

In view of the above-mentioned points, it is an object of the present invention to provide a vehicle control device and a vehicle control method which reflect an acceleration of a self vehicle and an acceleration of an object around the self vehicle individually on a determination of a commencing time of a predetermined drive assist in accordance with a relative positional relationship between the self vehicle and the object around the self vehicle, and which determine the commencing time more appropriately.

Means for Solving Problems

To achieve the object above, a vehicle control device according to an embodiment of the present invention starts a predetermined drive assist in accordance with a relative positional relationship between a self vehicle and an object around the self vehicle, including a control value calculating part which calculates a control value based on an inter-vehicular distance between the self vehicle and the object, a velocity of the self vehicle, a relative velocity of the object to the self vehicle, and an acceleration-related value obtained based on at least one of an acceleration of the self vehicle and an acceleration of the object; an acceleration-related value adjusting part which adjusts the acceleration-related value by changing a degree of contribution of at least one of the acceleration of the self vehicle and the acceleration of the object in the acceleration-related value in accordance with a magnitude of the acceleration of the self vehicle; and a drive assist start judging part which starts the predetermined drive assist if the control value calculated by the control value calculating part is greater than a predetermined threshold value.

A vehicle control method according to an embodiment of the present invention starts a predetermined drive assist in accordance with a relative positional relationship between a self vehicle and an object around the self vehicle, including a control value calculating step in which a control value is calculated based on an inter-vehicular distance between the self vehicle and the object, a velocity of the self vehicle, a relative velocity of the object to the self vehicle, and an acceleration-related value obtained based on at least one of an acceleration of the self vehicle and an acceleration of the object; an acceleration-related value adjusting step in which the acceleration-related value is adjusted by changing a degree of contribution of at least one of the acceleration of the self vehicle and the acceleration of the object in the acceleration-related value in accordance with a magnitude of the acceleration of the self vehicle; and a drive assist start judging step in which the predetermined drive assist is started if the control value calculated in the control value calculating step is greater than a predetermined threshold value.

Effect of the Invention

Due to the above means, the embodiments of the present invention are able to provide a vehicle control device and a vehicle control method which reflect an acceleration of a self vehicle and an acceleration of an object around the self vehicle individually on a determination of a commencing time of a predetermined drive assist in accordance with a relative positional relationship between the self vehicle and the object around the self vehicle, and which determine the commencing time more appropriately.

BRIEF DESCRIPTION OF THE DRAWINGS

FIGS. 3A to 3J are diagrams illustrating relationships between a self vehicle and a leading vehicle in cases where an acceleration of the self vehicle is greater than or equal to zero.

FIGS. 4A to 4G are diagrams illustrating relationships between a self vehicle and a leading vehicle in cases where an acceleration of the self vehicle is less than zero.

FIGS. 7A to 7F are diagrams illustrating relationships between a self vehicle and a leading vehicle in cases where an acceleration of the self vehicle is greater than or equal to zero and an acceleration of the leading vehicle is greater than or equal to zero.

FIGS. 8A to 8D are diagrams illustrating relationships between a self vehicle and a leading vehicle in cases where an acceleration of the self vehicle is greater than or equal to zero and an acceleration of the leading vehicle is less than zero.

EXPLANATION OF REFERENCE SIGNS

Figure 1:
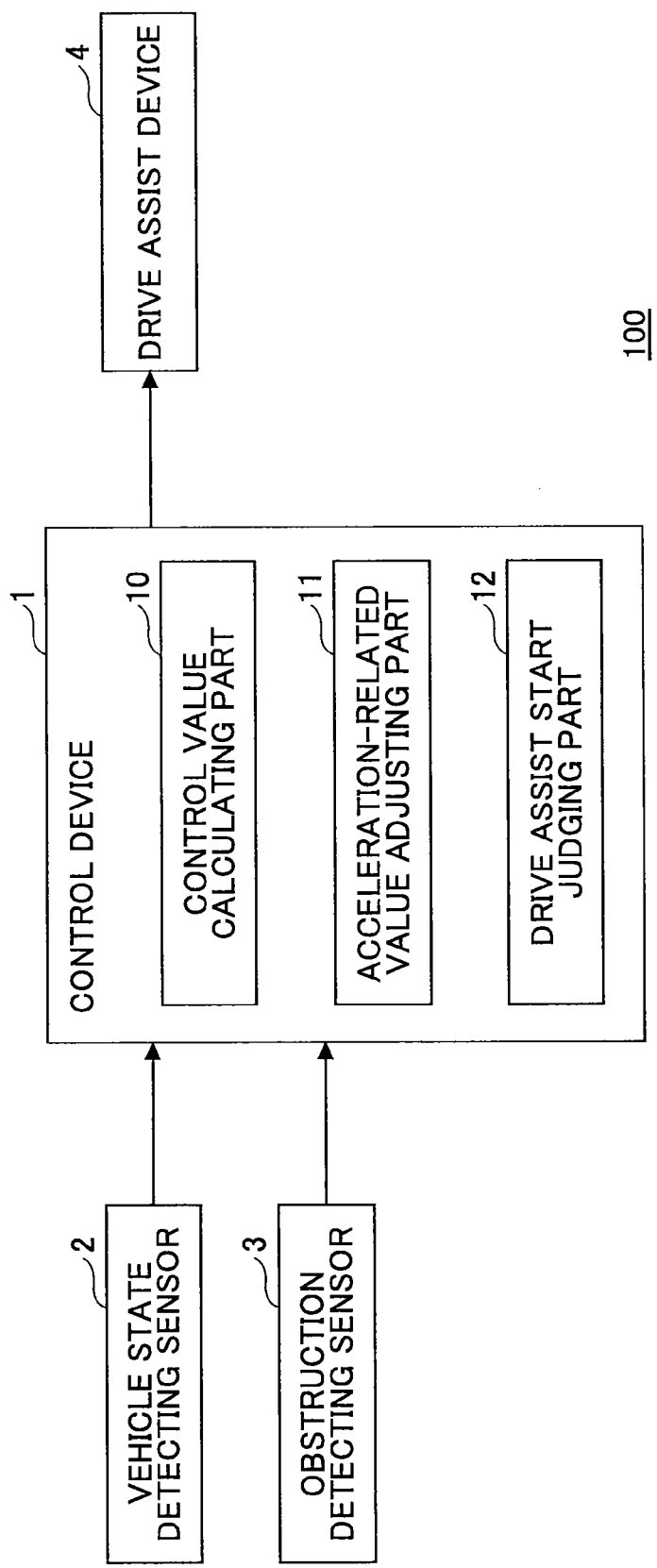
FIG. 1 is a functional block diagram illustrating a configuration example of a vehicle control device according to an embodiment of the present invention.

1 Control device
2 Vehicle state detecting sensor
3 Obstruction detecting sensor
4 Drive assist device
10 Control value calculating part
11 Acceleration-related value adjusting part
12 Drive assist start judging part
100 Vehicle control device
Am Acceleration of self vehicle
Ap Acceleration of leading vehicle
Ar Relative acceleration
Ax Acceleration-related value
CV Control value
D Inter-vehicular distance
TH Threshold value
Vm Velocity of self vehicle
Vp Velocity of leading vehicle
Vr Relative velocity

BEST MODE FOR CARRYING OUT THE INVENTION

With reference to the figures, the best mode for carrying out the present invention is described below.

First Embodiment

FIG. 1 is a functional block diagram illustrating a configuration example of a vehicle control device 100 according to an embodiment of the present invention. The vehicle control device 100 is mounted on a vehicle which a driver gets on board. Hereinafter the vehicle is referred to as a "self vehicle". The vehicle control device 100 is mainly comprised of a control device 1, a vehicle state detecting sensor 2, an obstruction detecting sensor 3, and a drive assist device 4. Also, the vehicle control device 100 controls a vehicle while taking a physical quantity representing a relative positional relationship between the self vehicle and an object around the self vehicle as an input value. For example, the vehicle control device 100 is a rear-end collision alarm device which outputs an alarm in a case where there is a likelihood of the self vehicle rear-ending a leading vehicle which is driving in front of the self vehicle.

The control device 1 is a computer having a CPU (Central Processing Unit), a RAM (Random Access Memory), a ROM (Read Only Memory), and the like. For example, the control device 1 reads a program corresponding to below-mentioned functional elements such as a control value calculating part 10, an acceleration-related value adjusting part 11, and a drive assist start judging part 12, loads them in the RAM, and causes the CPU to execute a process corresponding to the functional elements. Specifically, the control device 1 generates a control signal based on outputs of the vehicle state detecting sensor 2 and the obstruction detecting sensor 3, and outputs the generated control signal to the drive assist device 4.

The vehicle state detecting sensor 2 is configured to detect a state of a vehicle. The vehicle state detecting sensor 2 is connected to the control device 1 and outputs to the control device 1 a detection value or a calculation value which are related to a state of a vehicle, such as a velocity, an acceleration, a yaw rate, a steering angle, a steering torque, or the like.

Specifically, the vehicle state detecting sensor 2 is wheel speed sensors each of which is attached to one of wheels of the self vehicle, for example. Each of the wheel speed sensors outputs a wheel speed of corresponding one of the wheels to the control device 1. The control device 1 calculates a velocity Vm [m/s] of the self vehicle and an acceleration Am [m/s$^2$] of the self vehicle based on the wheel speeds of the wheels which the vehicle state detecting sensor 2 outputs.

However, the vehicle state detecting sensor 2 is not limited to the wheel speed sensor. The vehicle state detecting sensor 2 may be a rotation sensor which detects a rotating speed of a rotating body on a power transmission path which conveys power generated by a power source (e.g., an engine, an electric motor, or the like) of the self vehicle to a drive wheel, or a positional sensor such as a GPS (Global Positioning System) which detects positional data of the self vehicle.

The obstruction detecting sensor 3 is configured to detect an object around the self vehicle. The obstruction detecting sensor 3 is connected to the control device 1 and outputs to the control device 1 a detection value or a calculation value which are related to an obstruction, such as a relative distance of the obstruction to the self vehicle, a relative velocity, a relative acceleration, a lateral position, or the like.

Specifically, the obstruction detecting sensor 3 is a millimeter-wave radar which detects a distance between the self vehicle and an object around the self vehicle, for example. The millimeter-wave radar detects an inter-vehicular distance D [m] between the self vehicle and the leading vehicle. The millimeter-wave radar is attached to a central part of a front face of the self vehicle or within a front grille, for example. The millimeter-wave radar emits a millimeter-wave from a front face of the self vehicle to a predetermined angular range in a traveling direction, and receives a millimeter-wave reflected on the leading vehicle. Then, the millimeter-wave radar calculates the inter-vehicular distance D [m] between the self vehicle and the leading vehicle by measuring a period elapsing between the emission and the reception, and outputs the calculated value to the control device 1. Also, by applying the Doppler effect, the millimeter-wave radar may calculate a relative velocity Vr [m/s] which represents a velocity difference between a velocity Vm [m/s] of the self vehicle to which the millimeter-wave radar is attached and a velocity Vp [m/s] of the leading vehicle (Vr=Vp−Vm), and may output the calculated value to the control device 1. Also, the control device 1 calculates a relative velocity Vr [m/s] and a relative acceleration Ar [m/s$^2$] of the leading vehicle to the self vehicle based on the inter-vehicular distance D which the obstruction detecting sensor 3 outputs. Also, the control device 1 may calculate the relative acceleration Ar [m/s$^2$] based on the relative velocity Vr [m/s] which the obstruction detecting sensor 3 outputs. Also, the control device 1 calculates the velocity Vp [m/s] and the acceleration Ap [m/s$^2$] of the leading vehicle based on the velocity Vm [m/s] and the acceleration Am [m/s$^2$] of the self vehicle obtained or calculated from the output of the vehicle state detecting sensor 2, and based on the relative velocity Vr [m/s] and the relative acceleration Ar [m/s$^2$] obtained or calculated from the output of the obstruction detecting sensor 3.

The obstruction detecting sensor 3 is not limited to the millimeter-wave radar. The obstruction detecting sensor 3 may be a radar using a laser, infrared rays, or the like. The obstruction detecting sensor 3 may also be an image identifying device which calculates the inter-vehicular distance D [m] and the relative velocity Vr [m/s] based on image data captured by an imaging device such as a CCD camera. The image data include images in a traveling direction of the self vehicle. Also, the obstruction detecting sensor 3 may obtain the inter-vehicular distance D [m] between the self vehicle and the leading vehicle by using communications such as vehicle-to-vehicle communication, road-to-vehicle communication, vehicle-to-human communication, and road-to-human communication.

The drive assist device 4 is configured to perform a drive assist in response to a control signal from the control device 1. For example, the drive assist device 4 may be a buzzer which outputs an alarm, a display device which displays a warning message, a deceleration device which automatically controls a brake, or the like.

The control value calculating part 10 is configured to calculate a control value CV used in judging a commencement of an operation of the drive assist device 4.

The control value CV is calculated based on a velocity Vm of a self vehicle, a relative velocity Vr of a leading vehicle to the self vehicle, a velocity Vp of the leading vehicle, an acceleration Ap of the leading vehicle, and an inter-vehicular distance D. For example, the control value CV is expressed in a following equation (1).

$$CV = \frac{\alpha \times Vm - \beta \times Vr - \gamma \times Ax}{f(D)} \quad (1)$$

Here, "α", "β", and "γ" are positive constants. "f(D)" is a function of the inter-vehicular distance D. A value of "f(D)" increases with increase in the inter-vehicular distance D. "Ax" is a value calculated based on the acceleration Am of the self vehicle and the acceleration Ap of the leading vehicle. Hereinafter, "Ax" is referred to as an "acceleration-related value".

For example, the acceleration-related value Ax is expressed in a following equation (2).

$$Ax = a \times Ap - b \times Am \quad (2)$$

Here, "a" and "b" are weight coefficients of the acceleration Ap of the leading vehicle and the acceleration Am of the self vehicle, respectively.

For example, if "a"=1 and "b"=1, the acceleration-related value Ax represents a relative acceleration Ar (=Ap−Am) of the leading vehicle to the self vehicle.

The acceleration-related value Ax may be set as either one of the acceleration Ap of the leading vehicle and the relative acceleration Ar of the leading vehicle to the self vehicle, without using the weight coefficients "a" and "b".

The acceleration-related value adjusting part 11 is configured to adjust an acceleration-related value Ax. For example, the acceleration-related value adjusting part 11 adjusts the weight coefficients "a" and "b" in accordance with at least one of the acceleration Am of the self vehicle and the acceleration Ap of the leading vehicle.

Specifically, the acceleration-related value adjusting part 11 decreases the weight coefficient "b" of the acceleration Am of the self vehicle if the acceleration Am of the self vehicle is greater than or equal to a predetermined value (e.g., zero). Thus, the acceleration-related value adjusting part 11 decreases a degree of contribution of the acceleration Am of the self vehicle in the acceleration-related value Ax. In this case, the acceleration-related value Ax is more likely to be affected by the acceleration Ap of the leading vehicle than the acceleration Am of the self vehicle.

The drive assist start judging part 12 is configured to determine a commencing time of an operation of the drive assist device 4. For example, the drive assist start judging part 12 compares a control value CV calculated by the control value calculating part 10 to a predetermined threshold value TH. If the drive assist start judging part 12 determines that the control value CV is greater than or equal to the threshold value TH, the drive assist start judging part 12 outputs a control signal to the drive assist device 4. If the drive assist device 4 receives the control signal from the drive assist start judging part 12, the drive assist device 4 starts a drive assist. For example, the predetermined threshold value TH may be set for each driver, or for each driving environment such as driving on a highway, driving on an ordinary road, driving at night, driving in rain, or the like.

Figure 2:
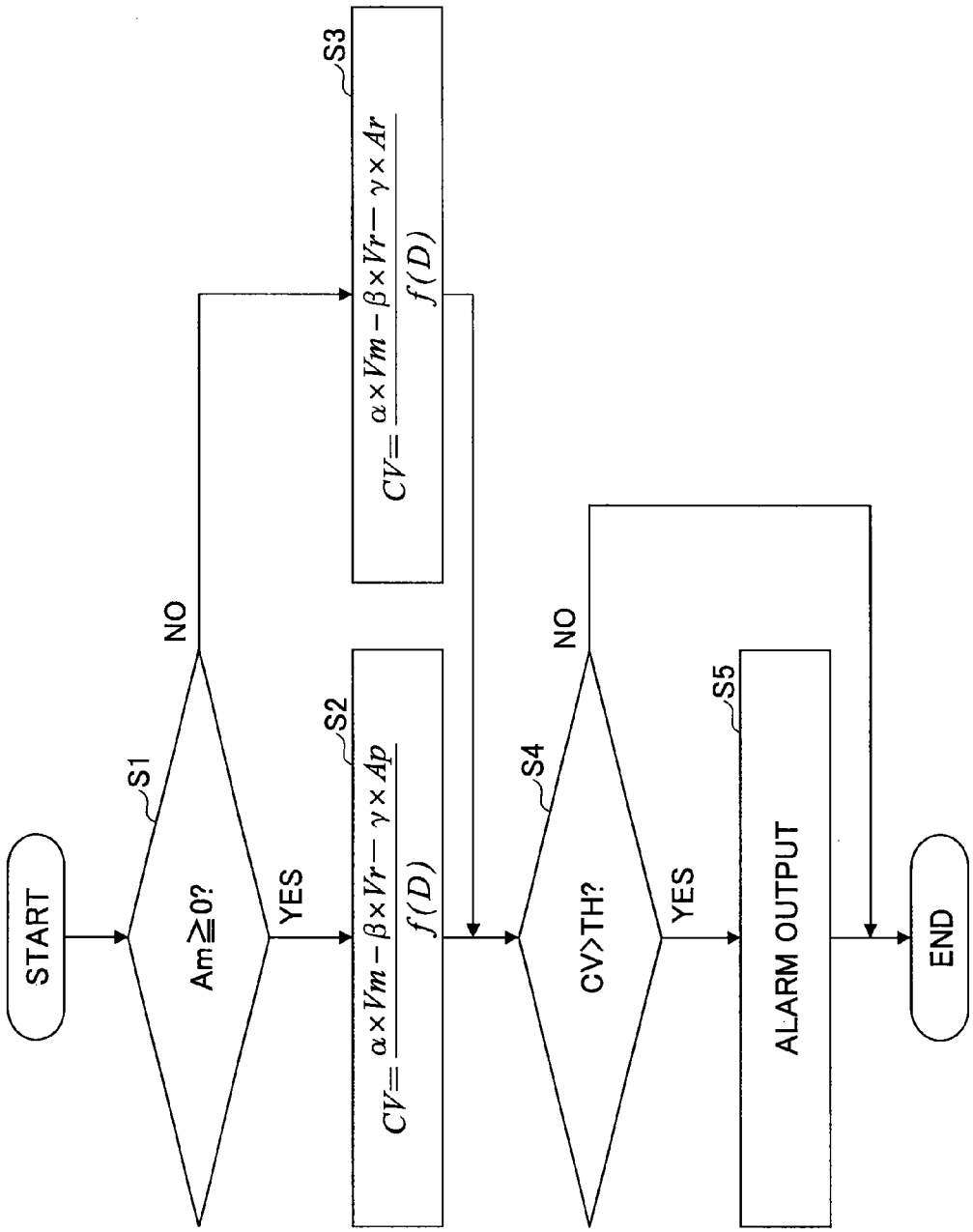
FIG. 2 is a flowchart illustrating an example of a drive assist start judging process.

Now, referring to FIG. 2, an example of a process in which the control device 1 judges whether to start a drive assist by the drive assist device 4 (hereinafter referred to as a "drive assist start judging process") will be explained. FIG. 2 is a flowchart illustrating an example of the drive assist start judging process. The control device 1 executes the drive assist start judging process repeatedly in predetermined periods.

This example is based on a premise that the control device 1 has already selected a target obstruction based on an output of the obstruction detecting sensor 3. The target obstruction is, for example, the closest leading vehicle of leading vehicles within a predetermined range in front of a self vehicle.

First, the control device 1 determines whether the acceleration Am of the self vehicle is greater than or equal to zero (step S1). This is to judge whether the self vehicle is accelerating.

If the control device 1 determines that the acceleration Am of the self vehicle is greater than or equal to a value "0" (YES in step S1), by means of the acceleration-related value adjusting part 11, the control device 1 sets the weight coefficient "b" of the acceleration Am of the self vehicle to a value "0" to remove a contribution of the acceleration Am of the self vehicle in the acceleration-related value Ax. Meanwhile, the control device 1 sets the weight coefficient "a" of the acceleration Ap of the leading vehicle to a value "1". Consequently, the acceleration-related value Ax becomes equal to the acceleration Ap of the leading vehicle. The control device 1 may merely adopt the acceleration Ap of the leading vehicle as the acceleration-related value Ax without using the weight coefficients "a" and "b".

On that basis, by means of the control value calculating part 10, the control device 1 calculates a control value CV (step S2). In this case, the control value CV is expressed in a following equation (3).

$$CV = \frac{\alpha \times Vm - \beta \times Vr - \gamma \times Ap}{f(D)} \quad (3)$$

On the other hand, if the control device 1 determines that the acceleration Am of the self vehicle is less than zero (NO in step S1), by means of the acceleration-related value adjusting part 11, the control device 1 sets each of the weight coefficient "a" of the acceleration Ap of the leading vehicle and the weight coefficient "b" of the acceleration Am of the self vehicle to a value "1". Consequently, the acceleration-related value Ax becomes equal to the relative acceleration Ar of the leading vehicle to the self vehicle. Even in this case, the control device 1 may merely adopt the relative acceleration Ar of the leading vehicle to the self vehicle as the acceleration-related value Ax without using the weight coefficients "a" and "b".

On that basis, by means of the control value calculating part 10, the control device 1 calculates a control value CV (step S3). In this case, the control value CV is expressed in a following equation (4).

$$CV = \frac{\alpha \times Vm - \beta \times Vr - \gamma \times Ar}{f(D)} \quad (4)$$

Subsequently, by means of the drive assist start judging part 12, the control device 1 compares the control value CV calculated in step S2 or step S3 to a threshold value TH (step S4). If the control device 1 determines that the control value CV is greater than the threshold value TH (YES in step S4), the control device 1 outputs a control signal to the drive assist device 4 (e.g., a buzzer) and causes the drive assist device 4 to output an alarm indicating that there is a risk of a rear end collision (step S5). On the other hand, if the control device 1 determines that the control value CV is less than or equal to the threshold value TH (NO in step S4), the control device 1 terminates the drive assist start judging process without outputting a control signal to the drive assist device 4. This is because there is recognized to be no risk of a rear end collision.

[In a Case where the Acceleration am of the Self Vehicle is Greater than or Equal to Zero]

In a case where the acceleration Am of the self vehicle is greater than or equal to zero, a control value CV calculated by the equation (3) based on the acceleration Ap of the leading vehicle becomes smaller than a control value CV calculated by the equation (4) based on the relative acceleration Ar. In the following, referring to FIGS. 3A to 3J, the reason will be explained.

FIGS. 3A to 3J are diagrams illustrating relationships between a self vehicle and a leading vehicle in a case where an acceleration Am of the self vehicle is greater than or equal to zero. In FIGS. 3A to 3J, an arrow represented by a horizontal-striped hatching, an arrow represented by a diagonal hatching, and a black arrow indicate directions and magnitudes of the acceleration Ap of the leading vehicle, the acceleration Am of the self vehicle, and the relative acceleration Ar, respectively. Absence of the arrow indicates that a corresponding acceleration is zero. A value of acceleration becomes positive in accelerating and negative in decelerating.

Figure 3C:
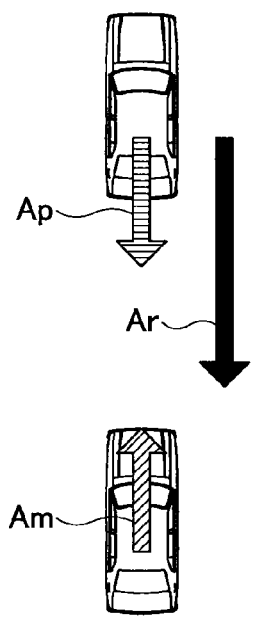
Figure 3D:
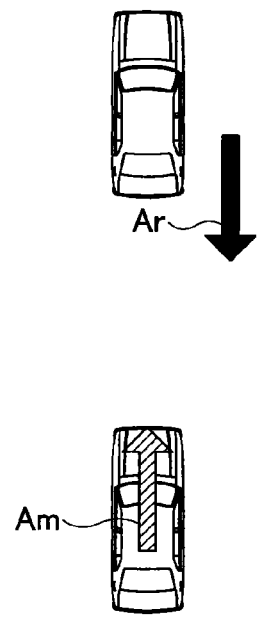

FIGS. 3A to 3G illustrate cases where the acceleration Am of the self vehicle is greater than zero. FIGS. 3H to 3J illustrate cases where the acceleration Am of the self vehicle is zero. FIG. 3A illustrates a case where an absolute value of the acceleration Ap (negative) of the leading vehicle is less than an absolute value of the acceleration Am (positive) of the self vehicle. FIG. 3B illustrates a case where an absolute value of the acceleration Ap (negative) of the leading vehicle is greater than an absolute value of the acceleration Am (positive) of the self vehicle. FIG. 3C illustrates a case where an absolute value of the acceleration Ap (negative) of the leading vehicle is equal to an absolute value of the acceleration Am (positive) of the self vehicle. FIG. 3D illustrates a case where the acceleration Ap of the leading vehicle is zero. FIG. 3E illustrates a case where an absolute value of the acceleration Ap (positive) of the leading vehicle is less than an absolute value of the acceleration Am (positive) of the self vehicle. FIG. 3F illustrates a case where an absolute value of the acceleration Ap (positive) of the leading vehicle is greater than an absolute value of the acceleration Am (positive) of the self vehicle. FIG. 3G illustrates a case where an absolute value of the acceleration Ap (positive) of the leading vehicle is equal to an absolute value of the acceleration Am (positive) of the self vehicle. FIG. 3H illustrates a case where the acceleration Ap of the leading vehicle is zero. FIG. 3I illustrates a case where the acceleration Ap of the leading vehicle is negative. FIG. 3J illustrates a case where the acceleration Ap of the leading vehicle is positive.

As illustrated in FIGS. 3A to 3J, the acceleration Ap of the leading vehicle is always greater than or equal to the relative acceleration Ar. Meanwhile, an increase of the acceleration-related value Ax, i.e., using the acceleration Ap of the leading vehicle in place of the relative acceleration Ar as the acceleration-related value Ax, means a decrease of a value of numerator in the equation (3). Thus, a control value CV calculated by the equation (3) based on the acceleration Ap of the leading vehicle becomes smaller than a control value CV calculated by the equation (4) based on the relative acceleration Ar.

A decrease of a control value CV means that the control value CV is less likely to be greater than the threshold value TH. Hence, the control device 1 calculates a control value CV by the equation (3) based on the acceleration Ap of the leading vehicle if the acceleration Am of the self vehicle is greater than or equal to zero. Thus, the control device 1 makes the control value CV less likely to be greater than the threshold value TH in comparison to a case where a control value CV is calculated by the equation (4) based on the relative acceleration Ar.

In this way, the control device 1 makes the vehicle control device 100 less likely to output an alarm in comparison to a case where the control device 1 calculates a control value CV while putting importance on the relative acceleration Ar, if the self vehicle is accelerating, i.e., if it is recognized that a driver of the self vehicle accelerates the self vehicle purposely and thus there is less likelihood of distracted driving. This control is based on a view that a control value CV calculated while putting more importance on the acceleration Ap of the leading vehicle than the relative acceleration Ar fits with a sense of a driver, if the self vehicle is accelerating.

Consequently, the control device 1 is able to prevent a control value CV from being calculated while putting importance on the relative acceleration Ar in a case where the self vehicle is accelerating. That is, the control device 1 is able to prevent an alarm from being output too early by preventing a control value CV from being calculated while putting an excessive importance on the acceleration of the self vehicle.

[In a Case where the Acceleration am of the Self Vehicle is Less than Zero]

In a case where the acceleration Am of the self vehicle is less than zero, a control value CV calculated by the equation (4) based on the relative acceleration Ar becomes smaller than a control value CV calculated by the equation (3) based on the acceleration Ap of the leading vehicle. In the following, referring to FIGS. 4A to 4G, the reason will be explained.

FIGS. 4A to 4G are diagrams illustrating a relationship between a self vehicle and a leading vehicle in a case where an acceleration Am of the self vehicle is less than zero. In FIGS. 4A to 4G, as in FIGS. 3A to 3J, an arrow represented by a horizontal-striped hatching, an arrow represented by a diagonal hatching, and a black arrow indicate directions and magnitudes of the acceleration Ap of the leading vehicle, the acceleration Am of the self vehicle, and the relative acceleration Ar, respectively. Absence of the arrow indicates that a corresponding acceleration is zero. A value of acceleration becomes positive in accelerating and negative in decelerating.

FIG. 4A illustrates a case where an absolute value of the acceleration Ap (negative) of the leading vehicle is less than an absolute value of the acceleration Am (negative) of the self vehicle. FIG. 4B illustrates a case where an absolute value of the acceleration Ap (negative) of the leading vehicle is greater than an absolute value of the acceleration Am (negative) of the self vehicle. FIG. 4C illustrates a case where an absolute value of the acceleration Ap (negative) of the leading vehicle is equal to an absolute value of the acceleration Am (negative) of the self vehicle. FIG. 4D illustrates a case where the acceleration Ap of the leading vehicle is zero. FIG. 4E illustrates a case where an absolute value of the acceleration Ap (positive) of the leading vehicle is less than an absolute value of the acceleration Am (negative) of the self vehicle. FIG. 4F illustrates a case where an absolute value of the acceleration Ap (positive) of the leading vehicle is greater than an absolute value of the acceleration Am (negative) of the self vehicle. FIG. 4G illustrates a case where an absolute value of the acceleration Ap (positive) of the leading vehicle is equal to an absolute value of the acceleration Am (negative) of the self vehicle.

As illustrated in FIGS. 4A to 4G, the acceleration Ap of the leading vehicle is always less than the relative acceleration Ar. Meanwhile, an increase of the acceleration-related value Ax, i.e., using the relative acceleration Ar in place of the acceleration Ap of the leading vehicle as the acceleration-related value Ax, means a decrease of a value of numerator in the equation (4). Thus, a control value CV calculated by the equation (4) based on the relative acceleration Ar becomes smaller than a control value CV calculated by the equation (3) based on the acceleration Ap of the leading vehicle.

A decrease of a control value CV means that the control value CV is less likely to be greater than the threshold value TH. Hence, the control device 1 calculates a control value CV by the equation (4) based on the relative acceleration Ar if the acceleration Am of the self vehicle is less than zero. Thus, the control device 1 makes the control value CV less likely to be greater than the threshold value TH in comparison to a case where a control value CV is calculated by the equation (3) based on the acceleration Ap of the leading vehicle.

In this way, the control device 1 makes the vehicle control device 100 less likely to output an alarm in comparison to a case where the control device 1 calculates a control value CV while putting importance on the acceleration Ap of the leading vehicle, if the self vehicle is decelerating. This control is based on a view that a control value CV calculated while putting more importance on the relative acceleration Ar than the acceleration Ap of the leading vehicle fits with a sense of a driver, if the self vehicle is decelerating.

Consequently, the control device 1 is able to prevent a control value CV from being calculated while putting importance on the acceleration Ap of the leading vehicle in a case where the self vehicle is decelerating. That is, the control device 1 is able to prevent an alarm from being output too early by preventing a control value CV from being calculated without considering the acceleration of the self vehicle.

[A Temporal Change in a Control Value CV Calculated in the Drive Assist Start Judging Process in FIG. 2]

Figure 5:
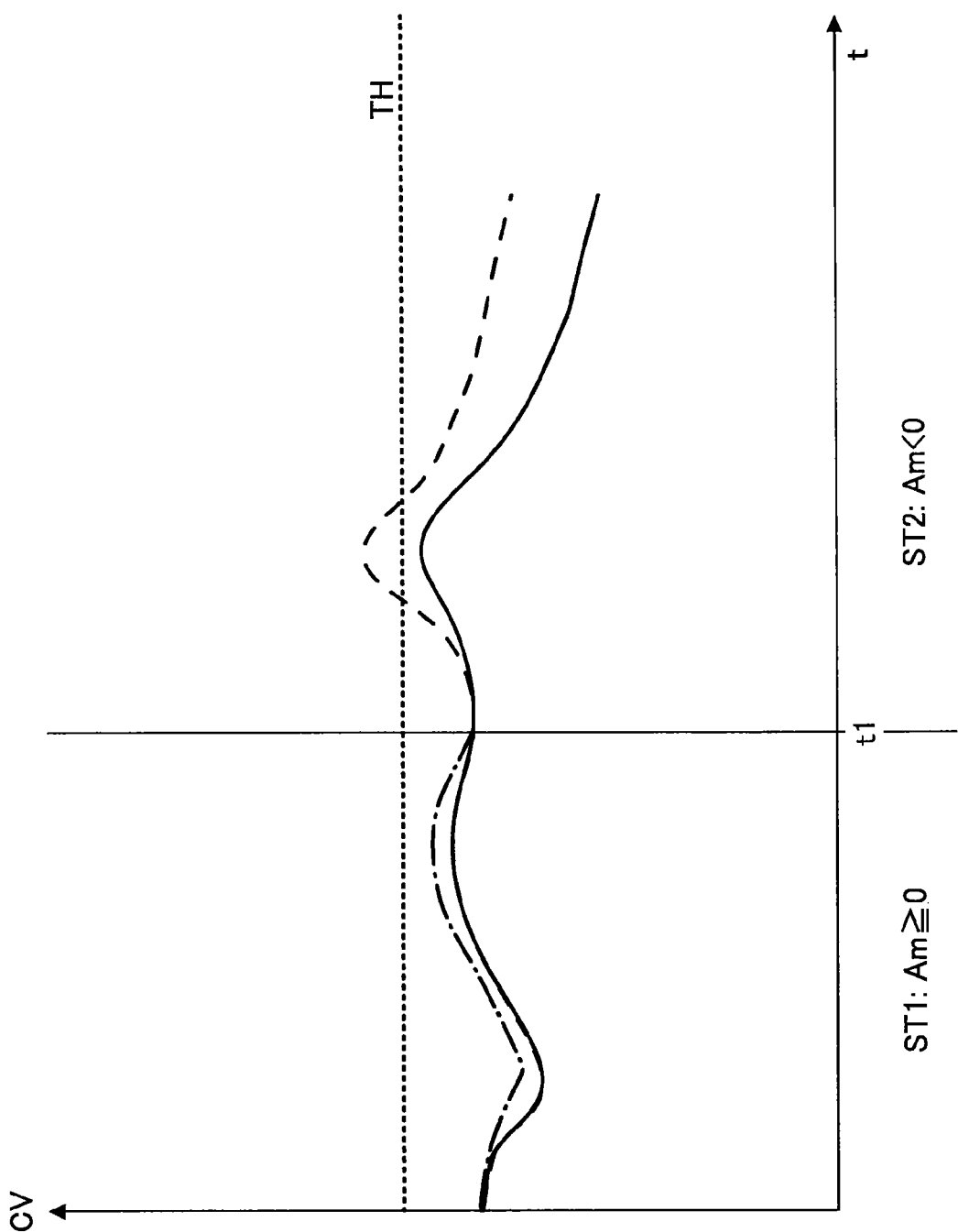
FIG. 5 is a diagram illustrating an example of a temporal change in control values calculated in the drive assist start judging process in FIG. 2.

Next, referring to FIG. 5, a temporal change in a control value CV calculated in the drive assist start judging process in FIG. 2 will be explained. In FIG. 5, a vertical axis corresponds to a control value CV and a horizontal axis corresponds to a time axis. FIG. 5 illustrates that a state of a vehicle is switched at a time t1 from a first state ST1 where the acceleration Am of the self vehicle is greater than or equal to zero to a second state ST2 where the acceleration Am of the self vehicle is less than zero. A solid line indicates a temporal change in a control value CV calculated in the drive assist start judging process in FIG. 2. A dashed line indicates a temporal change in a control value CV calculated by the equation (3) based on the acceleration Ap of the leading vehicle. A dashed-dotted line indicates a temporal change in a control value CV calculated by the equation (4) based on the relative acceleration Ar. A horizontal line (a dotted line) in FIG. 5 represents a level of the threshold value TH.

As illustrated in FIG. 5, a control value CV (see the solid line) calculated in the drive assist start judging process in FIG. 2 is calculated by the equation (3) based on the acceleration Ap of the leading vehicle in the first state ST1, and calculated by the equation (4) based on the relative acceleration Ar in the second state ST2. Thus, a control value CV (see the solid line) is less likely to exceed the threshold value TH in the first state ST1 in comparison to a case where a control value CV (see the dashed-dotted line) is calculated by the equation (4) based on the relative acceleration Ar. Also, a control value CV (see the solid line) is less likely to exceed the threshold value TH in the second state ST2 in comparison to a case where a control value CV (see the dashed line) is calculated by the equation (3) based on the acceleration Ap of the leading vehicle.

By the above configuration, the vehicle control device 100 is able to prevent an alarm from being output too early if the self vehicle is accelerating, i.e., if it is recognized that a driver of the self vehicle accelerates the self vehicle purposely and thus there is less possibility of a distracted driving.

The vehicle control device 100 is also able to prevent an alarm from being output in excessive response to a behavior of the leading vehicle if the self vehicle is decelerating.

Second Embodiment

Figure 6:
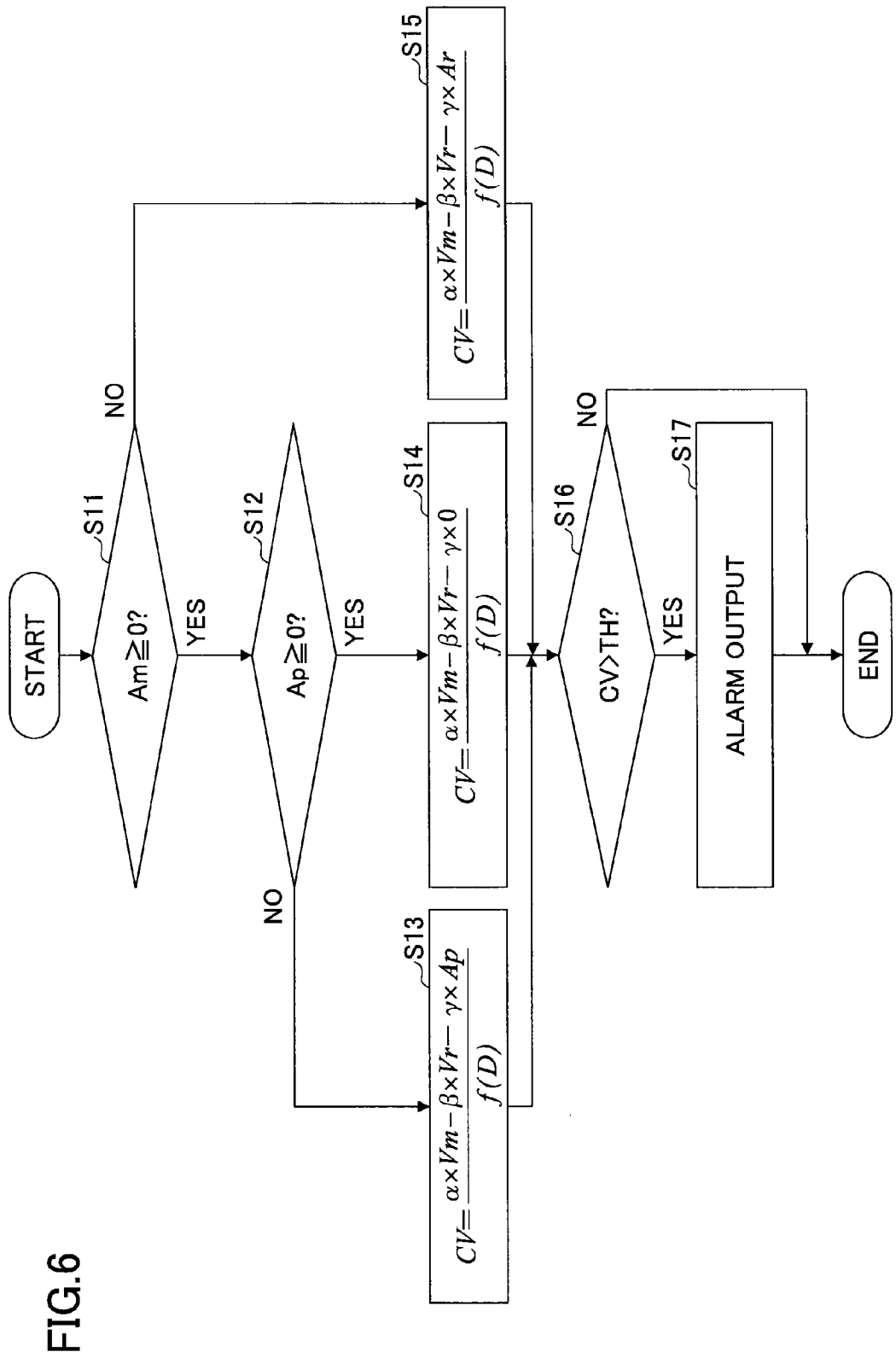
FIG. 6 is a flowchart illustrating another example of the drive assist start judging process.

Next, referring to FIG. 6, another example of the drive assist start judging process executed in the vehicle control device 100 according to an embodiment of the present invention will be explained. FIG. 6 is a flowchart illustrating another example of the drive assist start judging process. The control device 1 executes the drive assist start judging process repeatedly in predetermined periods.

This example is based on a premise that the control device 1 has already selected a target obstruction based on an output of the obstruction detecting sensor 3. The target obstruction is, for example, the closest leading vehicle of leading vehicles within a predetermined range in front of a self vehicle.

First, the control device 1 judges whether the acceleration Am of the self vehicle is greater than or equal to zero (step S11). This is to judge whether the self vehicle is accelerating.

If the control device 1 judges that the acceleration Am of the self vehicle is greater than or equal to zero (YES in step S11), the control device 1 judges whether the acceleration Ap of the leading vehicle is greater than or equal to zero (step S12).

If the control device 1 judges that the acceleration Ap of the leading vehicle is less than zero (NO in step 12), by means of the acceleration-related value adjusting part 11, the control device 1 sets the weight coefficient "b" of the acceleration Am of the self vehicle to a value "0" to remove a contribution of the acceleration Am of the self vehicle in the acceleration-related value Ax. Meanwhile, the control device 1 sets the weight coefficient "a" of the acceleration Ap of the leading vehicle to a value "1". Consequently, the acceleration-related value Ax becomes equal to the acceleration Ap of the leading vehicle. The control device 1 may merely adopt the acceleration Ap of the leading vehicle as the acceleration-related value Ax without using the weight coefficients "a" and "b".

On that basis, by means of the control value calculating part 10, the control device 1 calculates a control value CV (step S13). In this case, the control value CV is expressed in the above equation (3).

On the other hand, if the control device 1 judges that the acceleration Ap of the leading vehicle is greater than or equal to zero (YES in step S12), by means of the acceleration-related value adjusting part 11, the control device 1 sets each of the weight coefficient "a" of the acceleration Ap of the leading vehicle and the weight coefficient "b" of the acceleration Am of the self vehicle to a value "0" to remove a contribution of each of the acceleration Ap of the leading vehicle and the acceleration Am of the self vehicle in the acceleration-related value Ax. Consequently, the acceleration-related value Ax becomes equal to a value "0". Even in this case, the control device 1 may merely adopt a value "0" as the acceleration-related value Ax without using the weight coefficients "a" and "b".

On that basis, by means of the control value calculating part 10, the control device 1 calculates a control value CV (step S14). In this case, the control value CV is expressed in a following equation (5).

$$CV = \frac{\alpha \times Vm - \beta \times Vr - \gamma \times 0}{f(D)} \qquad (5)$$

On the other hand, if the control device 1 judges that the acceleration Am of the self vehicle is less than zero (NO in step S11), by means of the acceleration-related value adjusting part 11, the control device 1 sets each of the weight coefficient "a" of the acceleration Ap of the leading vehicle and the weight coefficient "b" of the acceleration Am of the self vehicle to a value "1". Consequently, the acceleration-related value Ax becomes equal to the relative acceleration Ar of the leading vehicle to the self vehicle. Even in this case, the control device 1 may merely adopt the relative acceleration Ar of the leading vehicle to the self vehicle as the acceleration-related value Ax without using the weight coefficients "a" and "b".

On that basis, by means of the control value calculating part 10, the control device 1 calculates a control value CV (step S15). In this case, the control value CV is expressed in the above equation (4).

Subsequently, by means of the drive assist start judging part 12, the control device 1 compares the control value CV calculated in step S13, step S14, or in step S15 to a threshold value TH (step S16). If the control device 1 judges that the control value CV is greater than the threshold value TH (YES in step S16), the control device 1 outputs a control signal to the drive assist device 4 (e.g., a buzzer) and causes the drive assist device 4 to output an alarm indicating that there is a risk of a rear end collision (step S17). On the other hand, if the control device 1 judges that the control value CV is less than or equal to the threshold value TH (NO in step S16), the control device 1 terminates the drive assist start judging process without outputting a control signal to the drive assist device 4. This is because there is recognized to be no risk of a rear end collision.

In the above, the drive assist start judging process judges whether the acceleration Ap of the leading vehicle is greater than or equal to zero, after judging whether the acceleration Am of the self vehicle is greater than or equal to zero. However, these judgments may be in random order. Both judgments may be performed simultaneously.

[In a Case where the Acceleration am of the Self Vehicle is Greater than or Equal to Zero and the Acceleration Ap of the Leading Vehicle is Greater than or Equal to Zero]

In a case where the acceleration Am of the self vehicle is greater than or equal to zero and the acceleration Ap of the leading vehicle is greater than or equal to zero, a control value CV calculated by the equation (5) becomes larger than a control value CV calculated by the equation (3) based on the acceleration Ap of the leading vehicle. In the following, referring to FIGS. 7A to 7F, the reason will be explained.

FIGS. 7A to 7F are diagrams illustrating relationships between a self vehicle and a leading vehicle in cases where an acceleration Am of the self vehicle is greater than or equal to zero and an acceleration Ap of the leading vehicle is greater than or equal to zero. In FIGS. 7A to 7F, as in FIGS. 3A to 3J and 4A to 4G, an arrow represented by a horizontal-striped hatching, an arrow represented by a diagonal hatching, and a black arrow indicate directions and magnitudes of the acceleration Ap of the leading vehicle, the acceleration Am of the self vehicle, and the relative acceleration Ar, respectively. Absence of the arrow indicates that a corresponding acceleration is zero. A value of acceleration becomes positive in accelerating and negative in decelerating.

FIGS. 7A to 7D illustrate cases where the acceleration Am of the self vehicle is greater than zero. FIGS. 7E and 7F illustrate cases where the acceleration Am of the self vehicle is zero. FIG. 7A illustrates a case where an absolute value of the acceleration Ap (positive) of the leading vehicle is less than an absolute value of the acceleration Am (positive) of the self vehicle. FIG. 7B illustrates a case where an absolute value of the acceleration Ap (positive) of the leading vehicle is greater than an absolute value of the acceleration Am (positive) of the self vehicle. FIG. 7C illustrates a case where an absolute value of the acceleration Ap (positive) of the leading vehicle is equal to an absolute value of the acceleration Am (positive) of the self vehicle. FIG. 7D illustrates a case where the acceleration Ap of the leading vehicle is zero. FIG. 7E illustrates a case where both the acceleration Am of the self vehicle and the acceleration Ap of the leading vehicle are equal to zero. FIG. 7F illustrates a case where the acceleration Am of the self vehicle is equal to zero and the acceleration Ap of the leading vehicle is positive.

As illustrated in FIGS. 7A to 7F, the acceleration Ap of the leading vehicle is always greater than or equal to the relative acceleration Ar. Also, the acceleration Ap of the leading vehicle is positive as long as the leading vehicle is accelerating. Meanwhile, a decrease of the acceleration-related value Ax, i.e., using a value "0" in place of the acceleration Ap (positive) of the leading vehicle as the acceleration-related value Ax, means an increase of a value of numerator in the equation (3). Thus, a control value CV calculated by the equation (5) becomes larger than a control value CV calculated by the equation (3) based on the acceleration Ap of the leading vehicle.

An increase of a control value CV means that the control value CV is more likely to be greater than the threshold value TH. Hence, the control device 1 calculates a control value CV by the equation (5) if the acceleration Am of the self vehicle is greater than or equal to zero and the acceleration Ap of the leading vehicle is greater than or equal to zero. Thus, the control device 1 makes the control value CV more likely to be greater than the threshold value TH in comparison to a case where a control value CV is calculated by the equation (3) based on the acceleration Ap of the leading vehicle.

In this way, the drive assist start judging process in FIG. 6 modifies a part of the drive assist start judging process in FIG. 2. The drive assist start judging process in FIG. 2 calculates a control value CV while putting more importance on the acceleration Ap of the leading vehicle than the relative acceleration Ar if the self vehicle is accelerating, and makes the vehicle control device 100 less likely to output an alarm. However, if both the self vehicle and the leading vehicle are accelerating, especially if the self vehicle approaches the leading vehicle as shown in FIG. 7A (e.g., if the self vehicle passes the accelerating leading vehicle), other control may be required. Specifically, the other control may delay an alarm output timing later than a timing determined by the equation (4) based on the relative acceleration Ar but not later than a timing determined by the equation (3) based on the acceleration Ap of the leading vehicle (i.e., a timing determined by the drive assist start judging process in FIG. 2).

Therefore, the drive assist start judging process in FIG. 6 basically determines the alarm output timing based on a control value CV calculated by the equation (3) if the acceleration Am of the self vehicle is greater than or equal to zero. Then, if the acceleration Am of the self vehicle is greater than or equal to zero and the acceleration Ap of the leading vehicle is greater than or equal to zero, the drive assist start judging process exceptionally determines the alarm output timing based on a control value CV calculated by the equation (5).

If the acceleration Am of the self vehicle is greater than or equal to zero and is greater than or equal to the acceleration Ap of the leading vehicle, the drive assist start judging process in FIG. 6 may make the control value CV more likely to be greater than the threshold value TH by calculating the control value CV by the equation (5) in comparison to a case where the control value CV is calculated by the equation (3) based on the acceleration Ap of the leading vehicle.

In this way, the control device 1 makes the vehicle control device 100 more likely to output an alarm in comparison to a case where the control value CV is calculated by the equation (3) based on the acceleration Ap of the leading vehicle, if the leading vehicle is accelerating, even if the self vehicle is accelerating, i.e., even if it is recognized that a driver of the self vehicle accelerates the self vehicle purposely and thus there is less likelihood of distracted driving. This control is based on a view that a control value CV calculated without being affected by any of the acceleration Am of the self vehicle and the acceleration Ap of the leading vehicle fits with a sense of a driver, if the leading vehicle is accelerating, even if the self vehicle is accelerating.

The control device 1 may make the vehicle control device 100 more likely to output an alarm if the acceleration Am (positive) of the self vehicle is greater than or equal to the acceleration Ap (positive) of the leading vehicle, in comparison to a case where a control value CV is calculated by the equation (3) based on the acceleration Ap of the leading vehicle. On the other hand, the control device 1 may make the vehicle control device 100 less likely to output an alarm if the acceleration Am (positive) of the self vehicle is greater than or equal to the acceleration Ap (positive) of the leading vehicle, in comparison to a case where a control value CV is calculated by the equation (4) based on the relative acceleration Ar.

[In a Case where the Acceleration am of the Self Vehicle is Greater than or Equal to Zero and the Acceleration Ap of the Leading Vehicle is Less than Zero]

In a case where the acceleration Am of the self vehicle is greater than or equal to zero and the acceleration Ap of the leading vehicle is less than zero, a control value CV calculated by the equation (3) based on the acceleration Ap of the leading vehicle becomes smaller than a control value CV calculated by the equation (4) based on the relative acceleration Ar. In the following, referring to FIGS. 8A to 8D, the reason will be explained.

FIGS. 8A to 8D are diagrams illustrating relationships between a self vehicle and a leading vehicle in cases where an acceleration Am of the self vehicle is greater than or equal to zero and an acceleration Ap of the leading vehicle is less than zero. In FIGS. 8A to 8D, as in FIGS. 3A to 3J, 4A to 4G, and 7A to 7F, an arrow represented by a horizontal-striped hatching, an arrow represented by a diagonal hatching, and a black arrow indicate directions and magnitudes of the acceleration Ap of the leading vehicle, the acceleration Am of the self vehicle, and the relative acceleration Ar, respectively. Absence of the arrow indicates that a corresponding acceleration is zero. A value of acceleration becomes positive in accelerating and negative in decelerating.

Figure 8A:
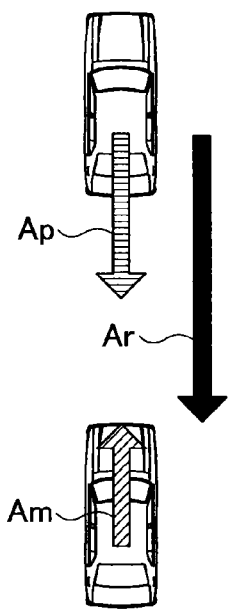
Figure 8B:
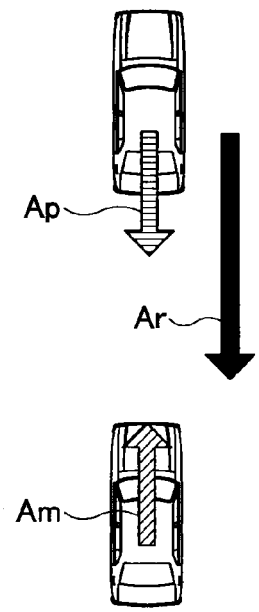

FIG. 8A illustrates a case where an absolute value of the acceleration Ap (negative) of the leading vehicle is greater than an absolute value of the acceleration Am (positive) of the self vehicle. FIG. 8B illustrates a case where an absolute value of the acceleration Ap (negative) of the leading vehicle is equal to an absolute value of the acceleration Am (positive) of the self vehicle. FIG. 8C illustrates a case where an absolute value of the acceleration Ap (negative) of the leading vehicle is less than an absolute value of the acceleration Am (positive) of the self vehicle. FIG. 8D illustrates a case where the acceleration Am of the self vehicle is zero.

As illustrated in FIGS. 8A to 8D, the acceleration Ap of the leading vehicle is always greater than or equal to the relative acceleration Ar. Meanwhile, an increase of the acceleration-related value Ax, i.e., using the acceleration Ap of the leading vehicle in place of the relative acceleration Ar as the acceleration-related value Ax, means a decrease of a value of numerator in the equation (3). Thus, a control value CV calculated by the equation (3) based on the acceleration Ap of the leading vehicle becomes smaller than a control value CV calculated by the equation (4) based on the relative acceleration Ar.

A decrease of a control value CV means that the control value CV is less likely to be greater than the threshold value TH. Hence, the control device 1 calculates a control value CV by the equation (3) based on the acceleration Ap of the leading vehicle if the acceleration Am of the self vehicle is greater than or equal to zero and the acceleration Ap of the leading vehicle is less than zero. Thus, the control device 1 makes the control value CV less likely to be greater than the threshold value TH in comparison to a case where a control value CV is calculated by the equation (4) based on the relative acceleration Ar.

In this way, the control device 1 makes the vehicle control device 100 less likely to output an alarm in comparison to a case where the control device 1 calculates a control value CV while putting importance on the relative acceleration Ar, if the self vehicle is accelerating, i.e., if it is recognized that a driver of the self vehicle accelerates the self vehicle purposely and thus there is less likelihood of distracted driving and if the leading vehicle is not accelerating. This control is based on a view that a control value CV calculated while putting more importance on the acceleration Ap of the leading vehicle than the relative acceleration Ar fits with a sense of a driver, if the self vehicle is accelerating and if the leading vehicle is not accelerating.

Also, the control device 1 is able to prevent a control value CV from being calculated while putting importance on the relative acceleration Ar in a case where the self vehicle is accelerating and the leading vehicle is not accelerating. That is, the control device 1 is able to prevent an alarm from being output too early by preventing a control value CV from being calculated while putting an excessive importance on the acceleration of the self vehicle.

[In a Case where the Acceleration am of the Self Vehicle is Less than Zero]

In a case where the acceleration Am of the self vehicle is less than zero, a control value CV calculated by the equation (4) based on the relative acceleration Ar becomes smaller than a control value CV calculated by the equation (3) based on the acceleration Ap of the leading vehicle. The reason is as described above with reference to FIGS. 4A to 4G.

As illustrated in FIGS. 4A to 4G, the acceleration Ap of the leading vehicle is always less than the relative acceleration Ar. Meanwhile, an increase of the acceleration-related value Ax, i.e., using the relative acceleration Ar in place of the acceleration Ap of the leading vehicle as the acceleration-related value Ax, means a decrease of a value of numerator in the equation (4). Thus, a control value CV calculated by the equation (4) based on the relative acceleration Ar becomes smaller than a control value CV calculated by the equation (3) based on the acceleration Ap of the leading vehicle.

A decrease of a control value CV means that the control value CV is less likely to be greater than the threshold value TH. Hence, the control device 1 calculates a control value CV by the equation (4) based on the relative acceleration Ar if the acceleration Am of the self vehicle is less than zero. Thus, the control device 1 makes the control value CV less likely to be greater than the threshold value TH in comparison to a case where a control value CV is calculated by the equation (3) based on the acceleration Ap of the leading vehicle.

In this way, the control device 1 makes the vehicle control device 100 less likely to output an alarm in comparison to a case where the control device 1 calculates a control value CV while putting importance on the acceleration Ap of the leading vehicle, if the self vehicle is decelerating. This control is based on a view that a control value CV calculated while putting more importance on the relative acceleration Ar than the acceleration Ap of the leading vehicle fits with a sense of a driver, if the self vehicle is decelerating.

Also, if the self vehicle is decelerating, the control device 1 is able to prevent an alarm from being output too early by calculating a control value CV while putting importance on the acceleration Ap of the leading vehicle, i.e., by calculating a control value CV without considering the acceleration of the self vehicle.

[A Temporal Change in a Control Value CV Calculated in the Drive Assist Start Judging Process in FIG. 6]

Figure 9:
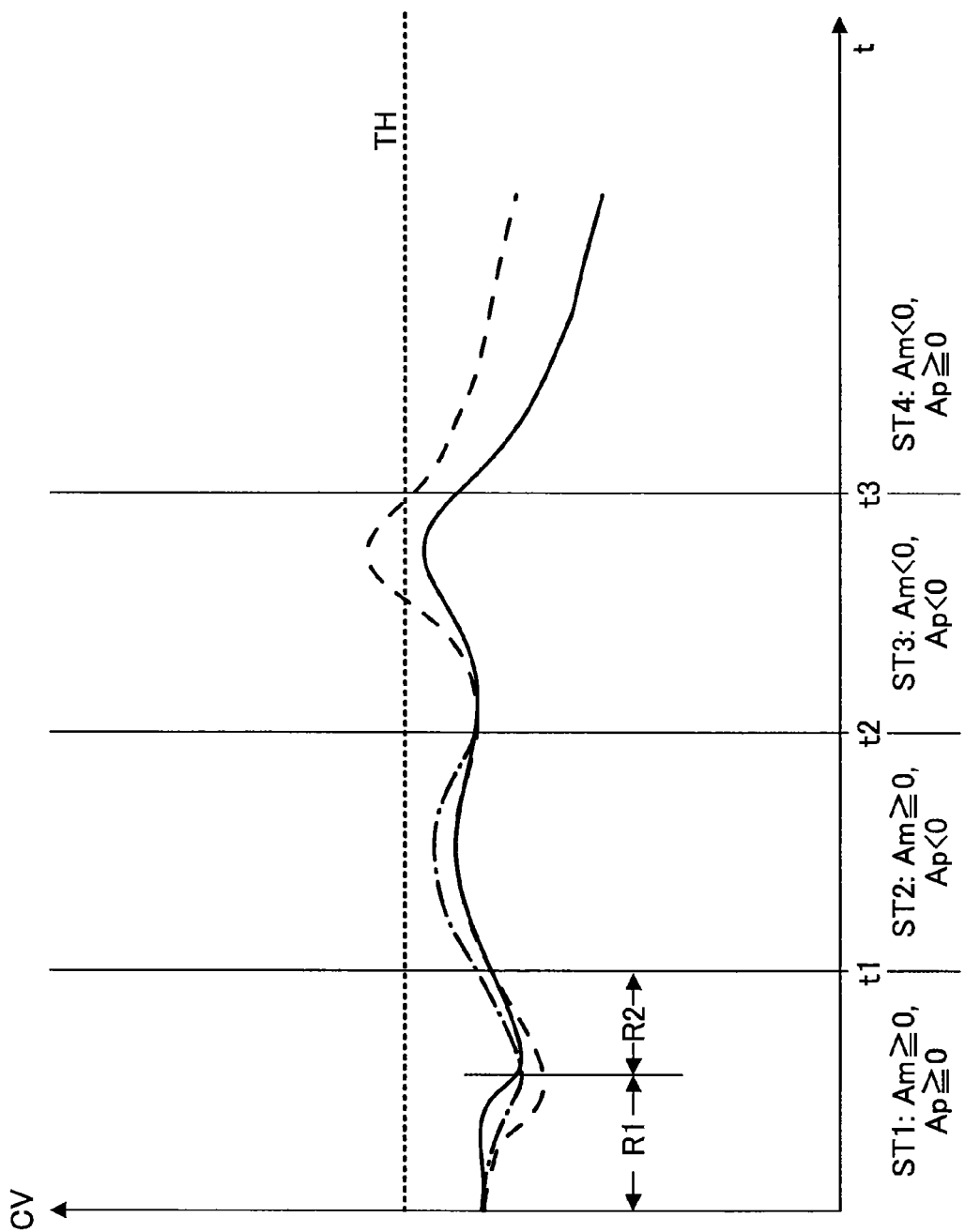
FIG. 9 is a diagram illustrating an example of a change in control values calculated in the drive assist start judging process in FIG. 6.

Next, referring to FIG. 9, a temporal change in a control value CV calculated in the drive assist start judging process in FIG. 6 will be explained. In FIG. 9, a vertical axis corresponds to a control value CV and a horizontal axis corresponds to a time axis.

FIG. 9 illustrates that a state of a vehicle is switched at a time t1 from a first state ST1 where the acceleration Am of the self vehicle is greater than or equal to zero and the acceleration Ap of the leading vehicle is greater than or equal to zero, to a second state ST2 where the acceleration Am of the self vehicle is greater than or equal to zero and the acceleration Ap of the leading vehicle is less than zero. Also, FIG. 9 illustrates that a state of a vehicle is switched at a time t2 from the second state ST2 to a third state ST3 where the acceleration Am of the self vehicle is less than zero and the acceleration Ap of the leading vehicle is less than zero. Also, FIG. 9 illustrates that a state of a vehicle is switched at a time t3 from the third state ST3 to a fourth state ST4 where the acceleration Am of the self vehicle is less than zero and the acceleration Ap of the leading vehicle is greater than or equal to zero. A solid line indicates a temporal change in a control value CV calculated in the drive assist start judging process in FIG. 6. A dashed line indicates a temporal change in a control value CV calculated by the equation (3) based on the acceleration Ap of the leading vehicle. A dashed-dotted line indicates a temporal change in a control value CV calculated by the equation (4) based on the relative acceleration Ar. A horizontal line (a dotted line) in FIG. 9 represents a level of the threshold value TH.

As illustrated in FIG. 9, a control value CV (see the solid line) calculated in the drive assist start judging process in FIG. 6 is calculated by the equation (5) based on a value "0" in the first state ST1, calculated by the equation (3) based on the acceleration Ap of the leading vehicle in the second state ST2, and calculated by the equation (4) based on the relative acceleration Ar in the third state ST3 and fourth state ST4.

Thus, a control value CV (see the solid line) is more likely to exceed the threshold value TH in the first state ST1 in comparison to a case where a control value CV (see the dashed line) is calculated by the equation (3) based on the acceleration Ap of the leading vehicle.

Especially, in a time period R1, a control value CV (see the solid line) is more likely to exceed the threshold value TH in comparison to a case where a control value CV (see the dashed line) is calculated by the equation (3) based on the acceleration Ap of the leading vehicle and a case where a control value CV (see the dashed-dotted line) is calculated by the equation (4) based on the relative acceleration Ar. Meanwhile, in the time period R1, the acceleration Ap of the leading vehicle is greater than the acceleration Am of the self vehicle, and the leading vehicle gets away from the self vehicle.

In a time period R2, a control value CV (see the solid line) is more likely to exceed the threshold value TH in comparison to a case where a control value (see the dashed line) is calculated by the equation (3) based on the acceleration Ap of the leading vehicle, and is less likely to exceed the threshold value TH in comparison to a case where a control value (see the dashed-dotted line) is calculated by the equation (4) based on the relative acceleration Ar. Meanwhile, in the time period R2, the acceleration Am of the self vehicle is greater than the acceleration Ap of the leading vehicle, and the self vehicle approaches the leading vehicle.

In the second state ST2, the control value CV (see the solid line) is less likely to exceed the threshold value TH in comparison to a case where a control value CV (see the dashed-dotted line) is calculated by the equation (4) based on the relative acceleration Ar.

In the third state ST3 and the fourth state ST4, a control value CV (see the solid line) is less likely to exceed the threshold value TH in comparison to a case where a control value CV (see the dashed line) is calculated by the equation (3) based on the acceleration Ap of the leading vehicle. Meanwhile, FIG. 9 shows that a control value CV (see the dashed line) calculated by the equation (3) based on the acceleration Ap of the leading vehicle exceeds the threshold value TH in the third state ST3, which means that an alarm is given prematurely.

By the above configuration, the vehicle control device 100 is able to prevent an alarm from being output too early, if the self vehicle is accelerating, i.e., if it is recognized that a driver of the self vehicle accelerates the self vehicle purposely and thus there is less likelihood of distracted driving.

Also, the vehicle control device 100 is able to prevent an alarm output timing from being delayed excessively, even if the self vehicle is accelerating, if the leading vehicle is accelerating.

Also, the vehicle control device 100 is able to prevent an alarm output timing from being delayed excessively, even if the self vehicle is accelerating, only if the leading vehicle is accelerating and the acceleration of the leading vehicle is less than the acceleration of the self vehicle.

Also, the vehicle control device 100 is able to prevent an alarm from being output in excessive response to a behavior of the leading vehicle if the self vehicle is decelerating.

The preferable embodiments of the present invention have been described in detail. However, the present invention is not limited to the above embodiments. Various changes and modifications may be made without departing from the scope of the present invention.

For example, in the above embodiments, the acceleration-related value adjusting part 11 sets the weight coefficients "a" and "b" to a value "1" or a value "0". However, the acceleration-related value adjusting part 11 may set them to other real values.

The invention claimed is:

1. A vehicle control device configured to start a predetermined drive assist in accordance with at least a relative positional relationship between a self vehicle and an object around the self vehicle, the vehicle control device comprising:
   circuitry configured to:
      select an acceleration of the object when the self vehicle is accelerating, and determine a commencing time of the predetermined drive assist based upon the selected acceleration of the object; and
      select a relative acceleration of the object with respect to the self vehicle when the self vehicle is not accelerating, and determine the commencing time of the predetermined drive assist based on the selected relative acceleration of the object.

2. The vehicle control device according to claim 1, wherein the circuitry is configured to determine the commencing time of the predetermined drive assist based on the acceleration of the object, if a value of the acceleration of the self vehicle is greater than or equal to zero.

3. The vehicle control device according to claim 1, wherein the circuitry is configured to determine the commencing time of the predetermined drive assist based on the relative acceleration of the object, if a value of the acceleration of the self vehicle is less than zero.

4. The vehicle control device according to claim 1, wherein the circuitry is configured to set a value of the acceleration of the object to zero and determine the commencing time of the predetermined drive assist based on the acceleration of the object, if a value of the acceleration of the self vehicle is greater than or equal to zero and the value of the acceleration of the object is greater than or equal to zero.

5. The vehicle control device according to claim 1, wherein the circuitry is configured to determine the commencing time of the predetermined drive assist based on the acceleration of the object, if a value of the acceleration of the self vehicle is greater than or equal to zero and a value of the acceleration of the object is less than zero.

6. A vehicle control method configured to start a predetermined drive assist in accordance with at least a relative positional relationship between a self vehicle and an object around the self vehicle, comprising steps of:
selecting an acceleration of the object when the self vehicle is accelerating, and determining a commencing time of the predetermined drive assist based upon the selected acceleration of the object, and
selecting a relative acceleration of the object with respect to the self vehicle when the self vehicle is not accelerating, and determining the commencing time of the predetermined drive assist based on the selected relative acceleration of the object.

7. The vehicle control device according to claim 1, wherein the circuitry is configured to:
calculate a control value based on an inter-vehicular distance between the self vehicle and the object, on a velocity of the self vehicle, on a relative velocity of the object, and on the acceleration of the object when the acceleration of the object is selected, and commence the predetermined drive assist if the calculated control value is greater than a predetermined threshold value; and
calculate the control value based on the inter-vehicular distance between the self vehicle and the object, the a velocity of the self vehicle, on the relative velocity of the object, and on the relative acceleration of the object when the relative acceleration of the object is selected, and commence the predetermined drive assist if the calculated control value is greater that the predetermined threshold value.

* * * * *